United States Patent
Park et al.

(10) Patent No.: US 10,336,167 B2
(45) Date of Patent: Jul. 2, 2019

(54) APPARATUS FOR PREVENTING INFLOW OF DUST IN REAR RAIL OF SUNROOF

(71) Applicants: Hyundai Motor Company, Seoul (KR); Kia Motors Corporation, Seoul (KR)

(72) Inventors: Jae Han Park, Suwon-si (KR); Se Min Moon, Hwaseong-si (KR); Kyu Kim, Hwaseong-si (KR); Yong Jik Lee, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/705,633

(22) Filed: Sep. 15, 2017

(65) Prior Publication Data

US 2018/0186226 A1     Jul. 5, 2018

(30) Foreign Application Priority Data

Dec. 31, 2016   (KR) .................. 10-2016-0169978

(51) Int. Cl.
| | |
|---|---|
| *B60J 7/057* | (2006.01) |
| *B60J 10/90* | (2016.01) |
| *B60J 7/047* | (2006.01) |
| *B60J 7/043* | (2006.01) |
| *B60J 7/02* | (2006.01) |

(52) U.S. Cl.
CPC .............. *B60J 7/057* (2013.01); *B60J 7/02* (2013.01); *B60J 7/022* (2013.01); *B60J 7/024* (2013.01); *B60J 7/043* (2013.01); *B60J 7/047* (2013.01); *B60J 10/90* (2016.02)

(58) Field of Classification Search
CPC ..... B60J 7/043; B60J 7/02; B60J 7/047; B60J 7/057; B60J 7/053; B60J 7/0573
USPC ..................... 296/216.01–224, 214
See application file for complete search history.

(56) References Cited

U.S. PATENT DOCUMENTS

| | | | | |
|---|---|---|---|---|
| 4,114,945 | A | * 9/1978 | Lutz ..................... | B60J 7/02 16/93 R |
| 4,293,161 | A | * 10/1981 | Lutz ..................... | B60J 7/003 296/213 |
| 4,968,090 | A | * 11/1990 | Schleicher ............ | B60J 7/02 296/216.06 |
| 2003/0227196 | A1* | 12/2003 | Langguth ............. | B60J 7/02 296/216.08 |

(Continued)

FOREIGN PATENT DOCUMENTS

KR   10-2010-0016981 A   2/2010

*Primary Examiner* — Dennis H Pedder
(74) *Attorney, Agent, or Firm* — Morgan, Lewis & Bockius LLP

(57) ABSTRACT

An apparatus for preventing an inflow of dust in a rear rail of a sunroof may include a rear rail of a sunroof; a tilt lever which has one end portion coupled to a moving glass and the other end portion positioned on the rear rail, and slides along a trajectory of the rear rail; a tilt lever shoe which is positioned at the other end portion of the tilt lever, and configured to be fastened by being fitted with the rear rail; and at least one guide rail which is positioned at the rear rail in a width direction of a vehicle, in which the tilt lever shoe is positioned to surround upper and lower portions of the guide rail, and the guide rail is configured to be sealed to prevent dust from flowing into the rear rail.

7 Claims, 4 Drawing Sheets

(56) References Cited

U.S. PATENT DOCUMENTS

2012/0153685 A1* 6/2012 Heo .......................... B60J 7/02
296/216.08

* cited by examiner

APPARATUS FOR PREVENTING INFLOW OF DUST IN REAR RAIL OF SUNROOF

CROSS-REFERENCE TO RELATED APPLICATION

The present application claims priority to Korean Patent Application No. 10-2016-0169978 filed on Dec. 13, 2016, the entire contents of which are incorporated herein for all purposes by this reference.

BACKGROUND OF THE INVENTION

Field of the Invention

The present invention relates to an apparatus for preventing an inflow of dust in a rear rail of a sunroof. More particularly, the present invention relates to an apparatus for preventing an inflow of dust in a rear rail of a sunroof, which is configured such that an adjacent end of a tilt lever surrounds the rear rail so that dust does not flow into the rear rail.

Description of Related Art

An opening may be formed in a roof panel of a vehicle to discharge air in the vehicle to the outside or introduce outside air into the vehicle, and a sunroof glass may be openably or closably mounted in the opening.

Particularly, recently, a panoramic sunroof, in which most of the roof panel of the vehicle is manufactured using glass, and a part of the roof panel is selectively opened or closed, is being widely used for allowing openness and enhancing aesthetic design.

With the panoramic sunroof, an occupant may not only have a larger amount of natural sunlight when the vehicle is stopped and travels, but also enjoy driving the vehicle by opening the panoramic sunroof when the vehicle is traveling.

The panoramic sunroof and the sunroof are designed to have a structure which is opened as a moving glass climbs over an upper side of the roof of the vehicle. That is, the sunroof, which is opened at an upper side of the roof, is configured such that the front moving glass is connected to a tilt lever, and the tilt lever is screw-fastened to the moving glass when the tilt lever slides so that the moving glass moves toward a rear side of the vehicle.

The attached FIG. 1 is a perspective view illustrating a rear rail of a sunroof in the related art, and FIG. 2 is a perspective view illustrating a tilt lever and the rear rail in the related art.

As the moving glass slides in a state in which one end portion of a tilt lever 1 is coupled to the moving glass and the other end portion of the tilt lever 1 is fitted with a rear rail 2, the tilt lever 1 stands up by being tilted at a predetermined angle, and then slides along a trajectory of the rear rail 2.

The moving glass, which is connected to one end portion of the tilt lever 1 that moves on the rear rail 2 as described above, moves toward a rear side of the roof of the vehicle based on a request of a user, so that the sunroof positioned on the roof is opened.

The aforementioned related art has a structure in which an interval is formed between a roof panel 3 and a side molding, such that an upper end portion of the rear rail 2 disposed at a lower side of the roof panel 3 is opened.

That is, an opened structure is configured between the side molding and the roof panel 3 by the tilt lever connected to the rear rail 2, and a space is formed between the roof panel 3 and the tilt lever 1, such that the rear rail 2 is exposed to the outside, and as a result, there is a problem in that an excessive operating load occurs.

Since a mechanism drive device is exposed to an outside environment as described above, when foreign substances including dust are trapped in the space, an excessive load is applied to a motor, which causes problems including an operational defect, an adverse effect on quality, and operational noise of the tilt lever.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing a technology for preventing dust from flowing into a predetermined gap between a rear rail and a tilt lever of a sunroof.

Moreover, the present invention includes a tilt lever shoe which is configured to surround a rear rail and coupled to seal the rear rail.

Additionally, the present invention includes stable movements of a tilt lever and a rear rail by restricting upward, downward, leftward, and rightward movements of a guide rail and the rear rail.

Nevertheless, the present invention is not limited by the aforementioned elements, and the other elements according to an exemplary embodiment of the present invention, which are not mentioned above, may be clearly described and understood from the following descriptions and may become apparent from the exemplary embodiments of the present invention. In addition, the present invention may be implemented by means and a combination thereof disclosed in the claims.

An apparatus according to an exemplary embodiment of the present invention for preventing an inflow of dust in a rear rail of a sunroof includes the following configurations.

Various aspects of the present invention are directed to providing an apparatus for preventing an inflow of dust in a rear rail of a sunroof, the apparatus including: a rear rail of a sunroof; a tilt lever which has one end portion coupled to a moving glass and the other end portion positioned on the rear rail, and slides along a trajectory of the rear rail; a tilt lever shoe which is positioned at the other end portion of the tilt lever, and configured to be fastened by being fitted with the rear rail; and at least one guide rail which is positioned at the rear rail in a width direction of a vehicle, in which the tilt lever shoe is positioned to come into contact with at least one of upper and lower surfaces of the guide rail, and the guide rail is configured to be sealed to prevent dust from flowing into the rear rail.

In an exemplary embodiment, the guide rail may be formed to be vertically symmetrical.

In another exemplary embodiment, the guide rails may be configured as two layers in a height direction of the vehicle.

In still another exemplary embodiment, the tilt lever shoe may be positioned to restrict the rear rail in left and right directions.

In yet another exemplary embodiment, the apparatus may further include a sealing portion which is configured at a position where the tilt lever shoe configured to surround the guide rail comes into contact with the rear rail.

In still yet another exemplary embodiment, the apparatus may further include a buffer portion which is configured at a position where the guide rail and the tilt lever shoe come into contact with each other.

In a further exemplary embodiment, the apparatus may further include a tension portion which is positioned at one end portion of the buffer portion.

In another further exemplary embodiment, the rear rail may be configured in a T shape.

The present invention may obtain the following effects through combinations of the aforementioned present exemplary embodiments and configurations to be described below, and a use relationship.

Various aspects of the present invention are directed to providing the configuration that prevents an inflow of dust between the rear rail and the tilt lever, and as a result, it is possible to reduce expenditures incurred by repair, replacement, and the like caused by operational defects, and to improve reliability of the sunroof and convenience for a user.

In addition, according to an exemplary embodiment of the present invention, it is possible to solve a problem of operational noise that is generated by the tilt lever due to an inflow of foreign substances into the rear rail.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1:
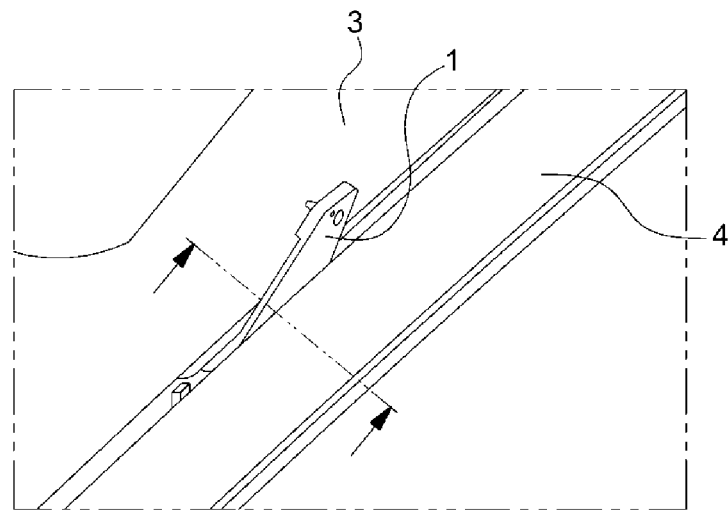
FIG. 1 illustrates a configuration of a tilt lever fastened to a rear rail of a sunroof in the related art.
Figure 2:
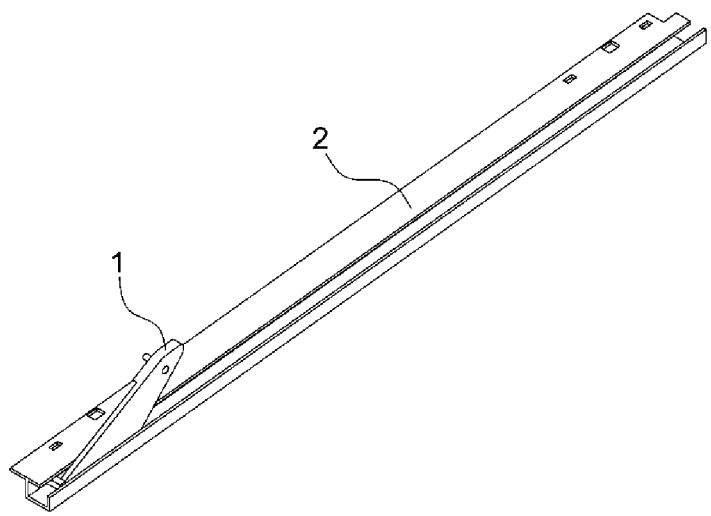
FIG. 2 is a view illustrating the configurations of the tilt lever and the rear rail in the related art.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in more detail with reference to the accompanying drawings. The exemplary embodiments of the present invention may be modified in various forms, and the scope of the present invention should not be interpreted as being limited to the following exemplary embodiments. The present exemplary embodiments are provided for more completely explaining the present invention to the person with ordinary skill in the art.

The term "unit", "part", or the like, which is described in the specification, signifies a unit that performs one or more functions or operations, and the "unit", "part", or the like may be implemented by a combination of hardware.

Various aspects of the present invention are directed to providing an apparatus for preventing an inflow of dust in a rear rail 30 of a sunroof, preventing dust from flowing into a coupling portion between a tilt lever 10 and a rear rail 30, preventing malfunction while the tilt lever 10 slides on the rear rail 30, and solving an operation defect of the sunroof.

Figure 3:
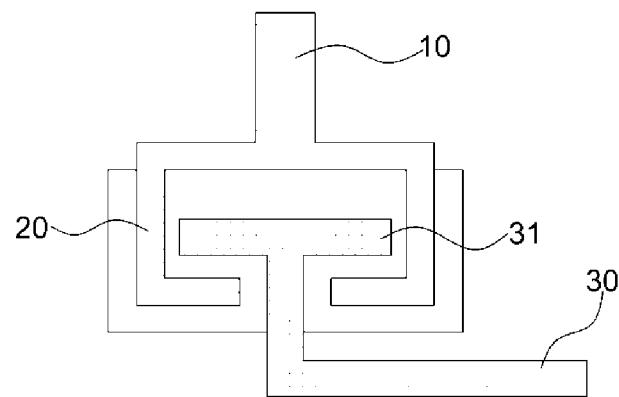
FIG. 3 is a view of illustrating a configuration of a tilt lever coupled to a rear rail according to an exemplary embodiment of the present invention.

FIG. 3 is a cross-sectional side view illustrating a coupling relationship among the tilt lever 10, a tilt lever shoe 20, and the rear rail 30 as an exemplary embodiment of the present invention.

As an exemplary embodiment of the present invention, the sunroof includes a moving glass and a roof glass, and includes the rear rail 30 configured such that the moving glass moves in a longitudinal direction along both lateral sides of the roof glass.

The rear rail 30 is fixedly positioned inside the roof glass, and the rear rail 30 is connected to one end portion of the tilt lever 10.

The other end portion of the tilt lever 10 is connected to the moving glass, such that the tilt lever 10 and the moving glass may move simultaneously.

As the moving glass slides in a state in which the tilt lever 10 is fitted with the rear rail 30, the tilt lever 10 stands up by being tilted at a predetermined angle, and then slides along a trajectory of the rear rail 30.

As described above, the tilt lever 10 guides the sliding movement of the moving glass, and is configured to open the sunroof.

The rear rail 30 in an exemplary embodiment of the present invention includes a sealed structure, and is configured to block an inflow of foreign substances from the outside, and the apparatus for preventing an inflow of dust in the rear rail 30 includes the rear rail 30 of the sunroof, the tilt lever 10 which slides along a trajectory of the rear rail 30, and the tilt lever shoe 20 which is positioned to face the rear rail 30.

The rear rail 30 is configured to include a guide rail 31 which protrudes in a width direction of the vehicle, and the guide rail 31 is configured to be surrounded by the tilt lever shoe 20. The tilt lever shoe 20 may be configured to be inserted into the guide rail 31.

The guide rail 31 may be configured to be symmetrical in the width direction of the vehicle based on the rear rail 30. The guide rail 31 may be configured to form a T shape together with the rear rail 30.

The guide rail 31, which is configured in the T shape, is configured to be sealed by the tilt lever shoe 20 that surrounds the guide rail 31, and upper and lower surfaces of the guide rail 31, which is positioned in the width direction of the vehicle, may selectively come into contact with the tilt lever shoe 20.

At least one of the upper and lower surfaces of the guide rail 31 may come into contact with an internal surface of the tilt lever shoe 20.

The tilt lever shoe 20, which is configured to surround the guide rail 31, is configured to come into contact with the guide rail 31 in an up and down direction, and the tilt lever shoe 20 is formed to restrict upward and downward movements of the guide rail 31.

The tilt lever shoe 20, which is configured to come into contact with the upper and lower surfaces of the guide rail 31, may be configured to come into contact with left and right surfaces of the rear rail 30, and may be formed to restrict the rear rail 30 in left and right directions.

As described above, the tilt lever shoe 20 in an exemplary embodiment of the present invention is a constituent element that is fastened to the rear rail 30 and the guide rail 31, and the tilt lever shoe 20 is configured to restrict the movements of the tilt lever 10 and the rear rail 30.

The tilt lever shoe 20 may further include buffer portions 21 at positions facing the upper and lower surfaces of the guide rail 31, and when the tilt lever 10 moves, the buffer portions 21 are configured to reduce friction and absorb impact occurring at the guide rail 31 and the tilt lever shoe 20.

The tilt lever shoe 20 further includes tension portions 22 positioned at the other side of the buffer portions 21, and the tension portions 22 are configured to absorb vibration of the tilt lever 10 and the vehicle, removing vibration and noise occurring when the sunroof moves.

Figure 4:
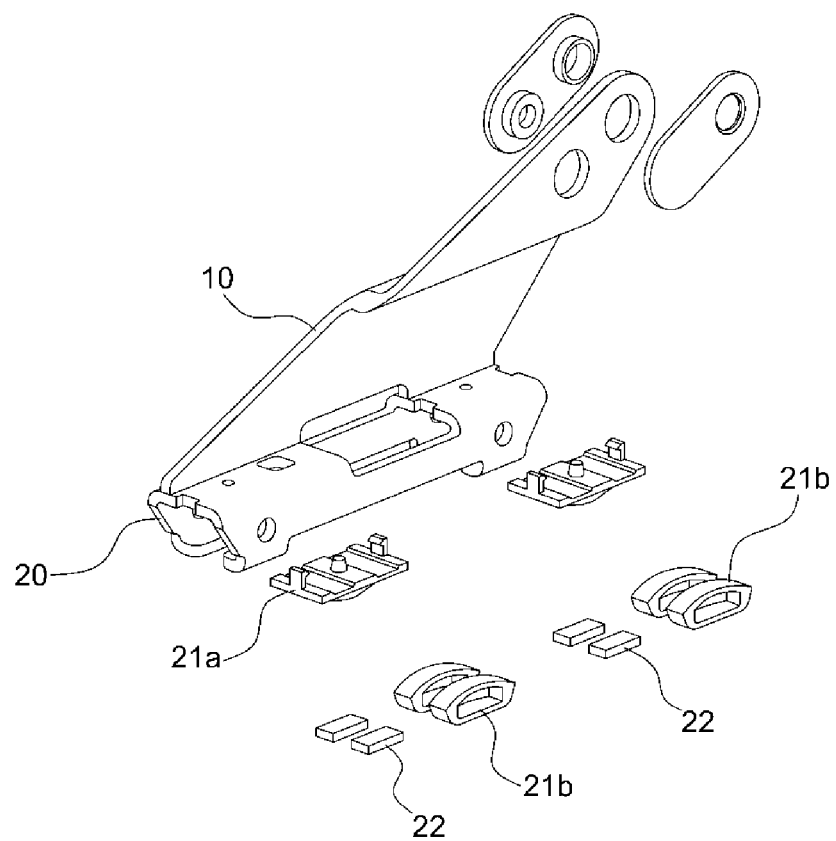
FIG. 4 is a configuration view of the tilt lever and a tilt lever shoe according to the exemplary embodiment of the present invention.

FIG. 4 is an exploded view of the configurations of the tilt lever 10 and the tilt lever shoe 20 according to the exemplary embodiment of the present invention.

As illustrated, the tilt lever 10, which has one end portion connected to the moving glass, is included, and the tilt lever shoe 20, which is positioned at the other end portion of the tilt lever 10, is disclosed.

The tilt lever 10 may be inclined at a predetermined angle to easily move the moving glass, and the tilt lever 10 may have two surfaces parallel to each other.

The tilt lever shoe 20 is included at the other end portion of the tilt lever 10, and the tilt lever shoe 20 has therein a predetermined space, and may have a catching shape formed as both end portions of the tilt lever shoe 20 is drawn inward and inserted into the guide rail 31.

The tilt lever shoe 20 is formed to be inserted into the guide rail 31, and may have the catching shape at a lower side of the guide rail 31.

The tilt lever shoe 20 may be configured to come into contact with at least one of the upper and lower surfaces of the guide rail 31. In addition, upper and lower internal surfaces of the tilt lever shoe 20, which come into contact with the guide rail 31, may include an upper buffer portion 21a and a lower buffer portion 21b, respectively.

The upper buffer portion 21a is configured to face the upper surface of the guide rail 31, and the lower buffer portion 21b is configured to come into contact with the lower surface of the guide rail 31. The tilt lever shoe 20, which is configured to come into contact with both of the upper and lower surfaces of the guide rail 31, is formed to restrict the upward and downward movements of the guide rail 31.

The tension portion 22 may be further included on the other surface of the buffer portion 21 which faces the guide rail 31, and the tension portion 22 is configured to absorb noise and vibration occurring when impact is applied to the tilt lever shoe 20 that comes into contact with the guide rail 31.

The tension portion 22 is configured to reduce friction occurring when the buffer portion 21 moves along the guide rail 31.

Figure 5:
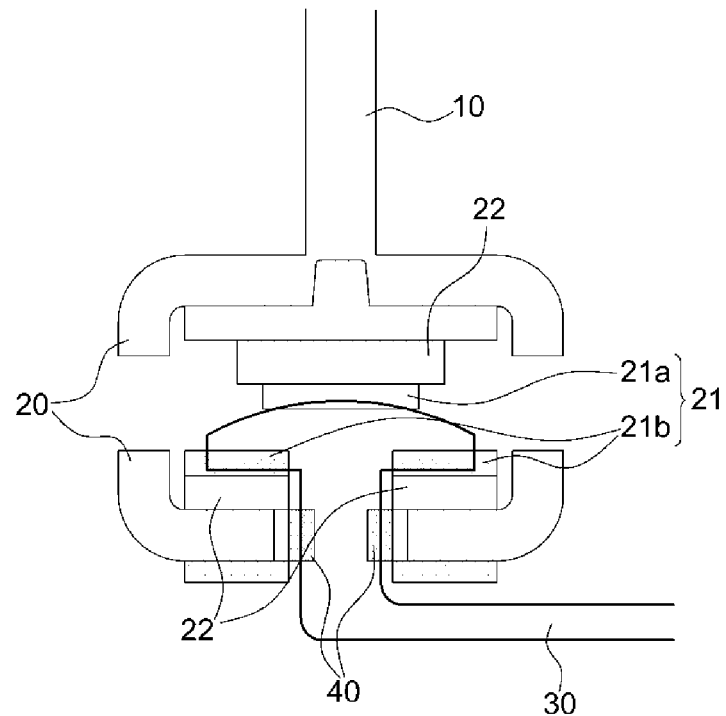
FIG. 5 is a cross-sectional view of the tilt lever and the tilt lever shoe according to the exemplary embodiment of the present invention.

FIG. 5 is a cross-sectional view of the tilt lever shoe 20, which is coupled to restrict the rear rail 30 in the height, left, and right directions, according to the exemplary embodiment of the present invention.

The upper buffer portion 21a and the lower buffer portion 21b, which are positioned at upper and lower end portions of the internal surface of the tilt lever shoe 20 having a sealed shape as illustrated, are configured to come into contact with the guide rail 31 positioned on the rear rail 30.

The movement in the height direction of the guide rail 31, which come into contact with the upper buffer portion 21a and the lower buffer portion 21b, may be restricted.

The tension portion 22, which is positioned to correspond to each of the buffer portion 21, is further included, and the tension portion 22 is configured to absorb contact force and tension applied to the buffer portion 21.

Sealing portions 40 may be further included at positions where the tilt lever shoe 20 and the rear rail 30 meet together, and thus the configuration for preventing dust from flowing into the rear rail 30 is included.

With the configuration of the sealing portions 40 of the tilt lever shoe 20 which are positioned to come into contact with the left and right surfaces of the rear rail 30, the left and right movements of the rear rail 30 are restricted, and as a result, structural stability of the rear rail 30 and the tilt lever 10 in the left and right direction is improved.

As described above, with the configuration of the guide rail 31 and the rear rail 30 which come into contact with the tilt lever shoe 20 of the present invention, the upward and downward movements and the leftward and rightward movements between the tilt lever 10 and the rear rail 30 are restricted, and as a result, coupling stability between the tilt lever 10 and the rear rail 30 is improved.

Figure 6:
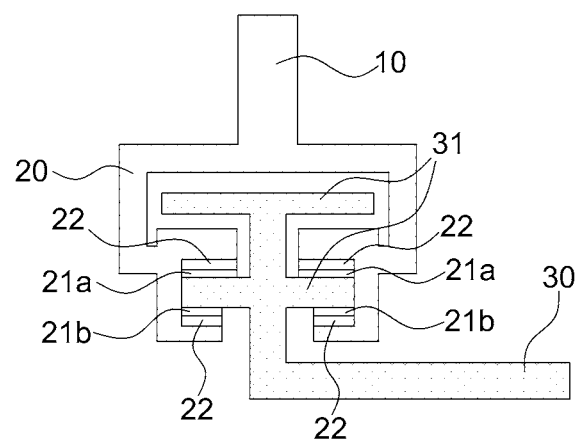
FIG. 6 is a view illustrating a coupling structure of a dual guide rail and a tilt lever according to another exemplary embodiment of the present invention.

FIG. 6 illustrates another exemplary embodiment of the present invention in which guide rails 31 are positioned in parallel in the width direction of the vehicle, and configured symmetrically with respect to a rear rail 30. Further, the guide rails 31 are configured as two layers, and may include a configuration in which the T-shaped guide rails 31 are continuously formed.

A tilt lever shoe 20 is included to surround the guide rails 31 configured as the two layers, and the tilt lever shoe 20 is configured to come into contact with both of a lower surface of an upper guide rail 31 and an upper surface of a lower guide rail 31, such that the upward and downward movements between the rear rail 30 and the tilt lever 10 are restricted.

The tilt lever shoe 20 is configured to surround a lower surface of the lower guide rail 31, and as a result, the tilt lever shoe 20 is configured to prevent dust from flowing into the rear rail 30.

A sealing portion 40 may be included to be positioned between the rear rail 30 and the tilt lever shoe 20, and the left and right surfaces of the rear rail 30 come into contact with the tilt lever shoe 20, such that the leftward and rightward movements of the tilt lever 10 and the rear rail 30 are restricted.

A buffer portion 21, which is configured at a position where the tilt lever shoe 20 comes into contact with the side rail 31, and a tension portion 22, which is positioned at one end portion of the buffer portion 21, may be further included, and the buffer portion 21 reduces frictional force between the guide rail 31 and the tilt lever shoe 20, and the tension portion 22 absorbs impact between the coupled constituent elements.

Figure 7:
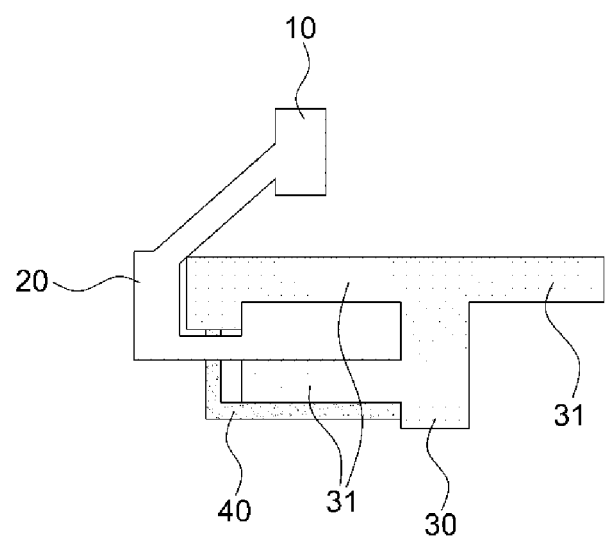
FIG. 7 is a view illustrating a coupling structure of a tilt lever coupled to a guide rail according to yet another exemplary embodiment of the present invention.

FIG. 7 illustrates a configuration of guide rails 31 according to yet another exemplary embodiment of the present invention, in which the guide rails 31 form two layers in one direction and form one layer in the other direction based on the width of the vehicle.

As illustrated, the guide rails 31 are configured asymmetrically based on the rear rail 30, and the guide rails 31 include two layers at one end portion and one layer at the other end portion in the width direction of the vehicle.

The tilt lever shoe 20 is inserted into the lateral sides of the guide rails 31 configured as the two layers, and both of a lower surface of an upper guide rail 31 and an upper surface of a lower guide rail 31 may come into contact with the tilt lever shoe 20.

The upper guide rail 31 of the guide rails 31 configured as the two layers may have one end portion that protrudes downward, and as a result, the configuration, which increases fastening force with the tilt lever shoe 20 and prevents withdrawal of the tilt lever shoe 20 when the tilt lever shoe 20 is coupled by being inserted into the guide rails 31, may be included.

A sealing portion 40, which is configured to seal the lower surface of the lower guide rail 31 and the rear rail 30 in an integrated manner, is included, and the sealing portion 40 may be configured to prevent dust from flowing into the rear rail 30.

The tilt lever shoe 20 is included to be inserted into the guide rails 31 configured as the two layers, the tilt lever shoe 20 is inserted into the guide rails 31 and moves in the longitudinal direction of the vehicle while the tilt lever 10 moves in the longitudinal direction of the vehicle. In addition, one end portion of the guide rail 31 configured as one layer may be configured to be inserted into the roof glass, and the tilt lever 10 is configured to be positioned on the guide rails 31 configured as two layers.

A buffer portion 21 and a tension portion 22, which are selectively configured at positions whether the tilt lever shoe 20 and the guide rails 31 meet together, may be included as a configuration for reducing frictional force and absorbing impact when the tilt lever 10 moves on the rear rail 30.

As described above, Various aspects of the present invention are directed to providing the configuration for preventing the situation in which dust flows into a gap existing at a position where the tilt lever 10 and the rear rail 30 are fastened to each other and the dust is then accumulated between the guide rail 31 and the tilt lever shoe 20, and as a result, the upward, downward, leftward, and rightward movements of the rear rail 30 and the tilt lever 10 are restricted, and movement performance of the tilt lever 10, which moves in the longitudinal direction of the vehicle, is maintained.

The guide rail 31 and the tilt lever shoe 20 are configured to be sealed, and as a result, it is possible to minimize dust flowing into between the tilt lever shoe 20 and the guide rail 31.

As a result, it is possible to prevent adherence of dust to the internal of the tilt lever 10, improve movement performance of the moving glass of the sunroof, and solve a problem of an operational defect of the sunroof.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for preventing an inflow of dust in a rear rail of a sunroof, the apparatus comprising:
    the rear rail of the sunroof which is disposed in a longitudinal direction thereof;
    a tilt lever which has a first end portion coupled to a moving glass and a second end portion disposed on the rear rail, and slides along a trajectory of the rear rail;
    a tilt lever shoe which is disposed at the second end portion of the tilt lever, and configured to be fastened by being fitted with the rear rail; and
    at least one guide rail which is disposed to protrude from the rear rail in a width direction of a vehicle,
    wherein an internal surface of the tilt lever shoe is disposed to contact with at least one of upper and lower surfaces of the at least one guide rail,
    wherein at least two layers of the at least one guide rail are surrounded by the tilt lever shoe so as to prevent a dust from flowing into the rear rail, and
    wherein the at least two layers include:
        an upper layer, wherein at least a surface of the upper layer is spaced with a gap from an inner upper of the tilt lever shoe; and a lower layer, wherein upper, lower and left and right surfaces of the lower layer are in contact with the internal surface of the tilt lever shoe.

2. The apparatus of claim 1, wherein the at least one guide rail is formed to be vertically symmetrical based on the rear rail.

3. The apparatus of claim 1, wherein the at least two layers at formed in a height direction of the vehicle.

4. The apparatus of claim 1, further comprising:
a sealing portion which is configured at a position where the tilt lever shoe configured to surround the at least one guide rail contacts with the rear rail.

5. The apparatus of claim 1, further comprising:
a buffer portion which is configured at a position where the at least one guide rail and the tilt lever shoe contact with each other.

6. The apparatus of claim 5, further comprising:
a tension portion which is disposed at an end portion of the buffer portion.

7. The apparatus of claim 1, wherein the at least one guide rail is configured in a T shape.

* * * * *